United States Patent [19]

Perry et al.

[11] Patent Number: 4,468,842
[45] Date of Patent: Sep. 4, 1984

[54] LOCKABLE BAND CLAMP

[75] Inventors: Kenneth R. Perry, Ottawa; Alexander F. Campbell, Woodlawn, both of Canada

[73] Assignee: Northern Telecom Limited, Montreal, Canada

[21] Appl. No.: 442,595

[22] Filed: Nov. 18, 1982

[30] Foreign Application Priority Data

Jun. 18, 1982 [CA] Canada .................................. 405463

[51] Int. Cl.³ ............................................ B65D 63/06
[52] U.S. Cl. ................................... 24/279; 24/20 TT; 24/20 LS; 24/241 SB; 24/284
[58] Field of Search .......... 24/279, 284, 20 R, 20 TT, 24/20 LS, 23 EE, 28, 27, 20 EE, 241 SB

[56] References Cited

U.S. PATENT DOCUMENTS

| 1,986,748 | 1/1935 | Pritchard | 24/279 |
| 2,365,017 | 12/1944 | Sprouse | 24/279 |
| 2,695,437 | 11/1954 | Bernard | 24/279 |
| 2,806,276 | 9/1957 | Cooper | 24/279 |
| 2,816,343 | 12/1957 | Decker, Jr. | 24/279 |
| 3,166,819 | 1/1965 | Robbins | 24/27 |
| 3,349,456 | 10/1967 | McKibben | 24/279 |
| 3,737,959 | 6/1973 | Smith et al. | 24/279 |
| 3,861,723 | 1/1975 | Kunz et al. | 24/279 |
| 4,083,588 | 4/1978 | Berger | 24/279 |

FOREIGN PATENT DOCUMENTS

| 532233 | 10/1956 | Canada . |
| 547975 | 10/1957 | Canada . |
| 626052 | 8/1961 | Canada . |
| 641214 | 5/1962 | Canada . |
| 688322 | 6/1964 | Canada . |
| 989598 | 5/1976 | Canada . |

*Primary Examiner*—Victor N. Sakran
*Attorney, Agent, or Firm*—Sidney T. Jelly

[57] ABSTRACT

A lockable band clamp, such as clamping together the rims of a housing and a base of an equipment housing, has a flexible band with Vee-shaped portions for positioning around the rims, the rims positioned in the Vee-shaped portions. The ends of the band have end members through which passes a bolt, a tubular member threading on to the bolt. Relative rotation between bolt and tubular member acts to pull the end members together and tighten the band about the rims. The end members have projections which overlap. A locking member which, in a locked position, engages at one end over a rod through the tubular member and at the other end aligns with holes in the projections whereby a padlock can pass through the holes and a formation on the locking member, preventing relative rotation between bolt and tubular member.

14 Claims, 11 Drawing Figures

LOCKABLE BAND CLAMP

This invention relates to a lockable band clamp to retain a housing on a base and for similar purposes. Particularly the clamp is used to lock a housing on a base, the housing containing line equipment for telecommunications, the housing often being pole mounted.

For protection and to avoid interference with the equipment, it is necessary to retain the housing on the base and to prevent unauthorized removal. Also, with pressurized cables, the interior of the housing will also be pressurized and injury, and damage, can occur by illicit removal of the clamp holding the housing and base together. It is therefore normal to lock the clamp, after it has been tightened, to prevent any unauthorized loosening, and removal, of the clamp.

However, certain difficulties occur with the present types of clamp. Also it has been found relatively easy to pry off the clamp. This can result in the housing being ejected upward by internal pressure, with possible injury and damage to the housing and also the equipment. A further feature is that whereas previously the housings were of painted steel, they are now being made of stainless steel. Such housings form attractive and useful containers and pilferage of housings has become a problem. Somewhat similar problems can occur for other structures, where two member having cooperating rims, require clamping together.

The present invention provides a band clamp which envelopes two adjacent circumferential rims, one of which can be on a base and the other on the housing, the band having Vee shaped cross-sectional portions spaced peripherally, the ends of the band being pulled together by a clamp which is tightened by rotation of a threaded member, the rotation of the threaded member capable of being prevented by a locking member which in turn is locked, by a padlock, in a locking position.

Broadly, the invention comprises a flexible band carrying Vee shaped cross-sectional portions, the Vee opening towards the inside, opposed ends of the band having portions one of which retains a rod and the other retains a tubular member, the rod passing through the tubular member. The rod is pulled through the tube, by relative rotation at the rod and tubular member, a thread on the rod engaging with a thread in the tubular member. The band can be loosened or tightened, as desired. A locking member is moved to engage with the portions on the ends of the band and locked in this position, after tightening of the clamp and band.

The invention will be understood by the following description of two embodiments, by way of example, in conjunction with the accompanying drawings, in which.

Figure 1:
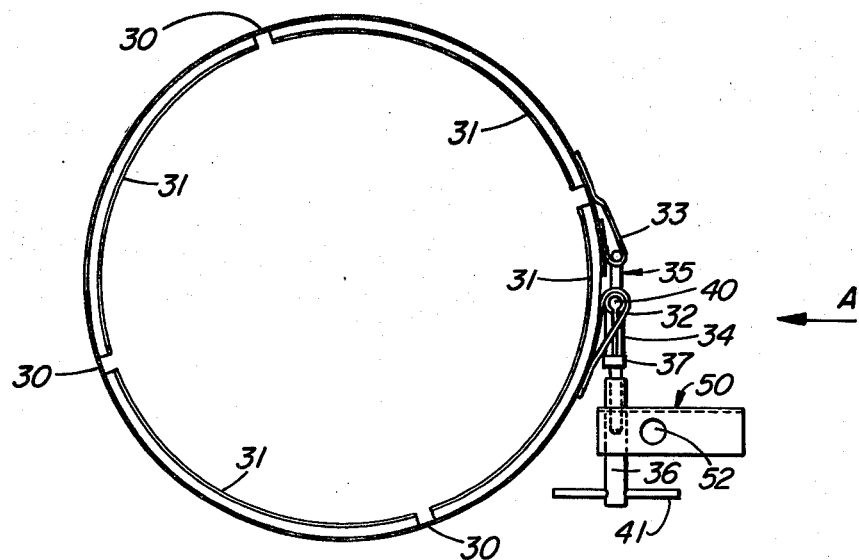
FIG. 1 is a plan view of an existing form of band clamp.
Figure 2:
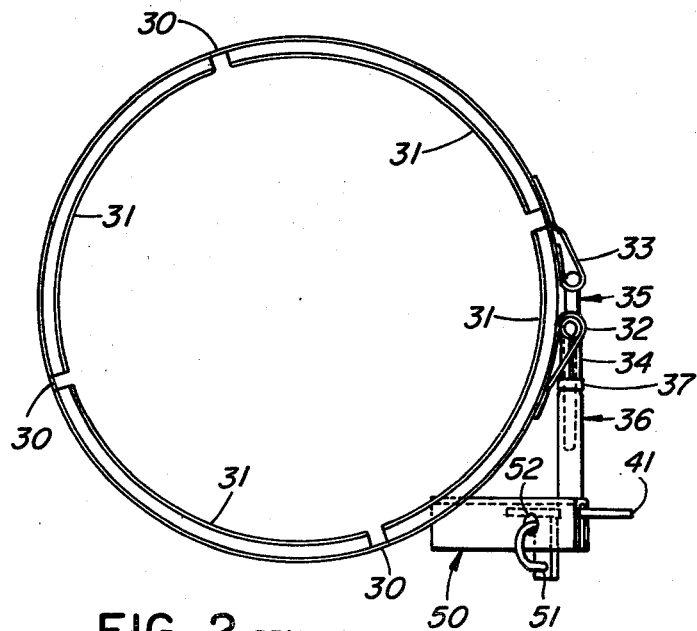
FIG. 2 is a plan view of the band as in FIG. 1, illustrating the locking member in a locked position.
Figure 3:
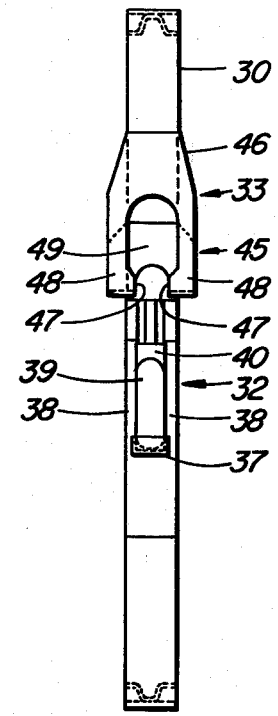
FIG. 3 is a side view of the band, in the direction of arrow A in FIG. 1, but withh rod and tubular member removed.

FIGS. 1, 2 and 3 illustrate a conventional band clamp, comprising a flat flexible band 30 carrying Vee shaped channel portions 31 attached thereto. These portions are spaced apart short distances to provide flexibility in the band structure as the portions 31 are themselves substantially inflexible because of their cross-section.

A closed loop member is formed or provided at each end of the band, in the example the band being bent over to form one end member 32, while a separate end member 33 is attached to the other end of the band. A tubular member 34 is mounted in end member 32 and a rod 35 is mounted in the other end member 33. The rod 35 passes through the tubular member.

The rod is threaded for at least a portion of its length from its outer end and an internally threaded handle 36 screws on to the rod, the inner end of the handle being arranged to abut a collar 37 on the end of the tubular member 34, when tightening the band. Thus rotation on the handle in one direction or the other will tighten or loosen the band.

Figure 7:
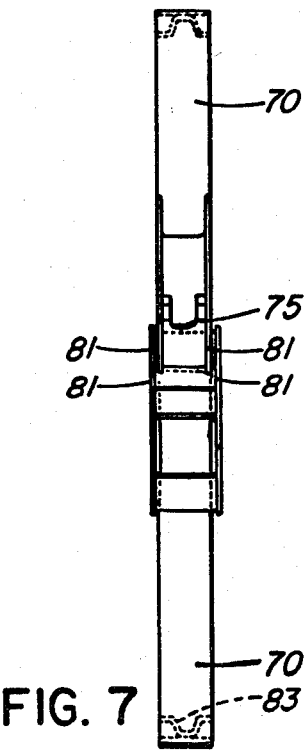
FIG. 7 is a side view of the band, in the direction of arrow C in FIG. 6.
Figure 6:
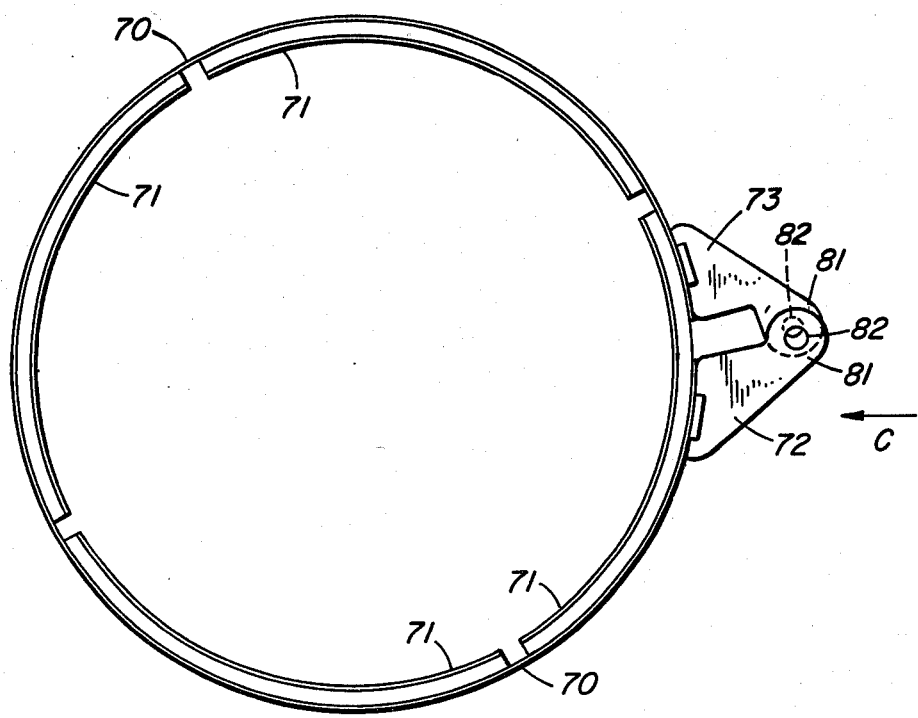
FIG. 6 is a plan view of the band, illustrating the end members attached to the band.
Figure 9:
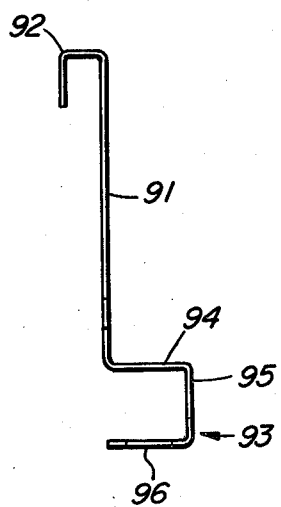
FIGS. 8, 9, 10 and 11 are plan view, side view and end views respectively of the locking member.
Figure 8:
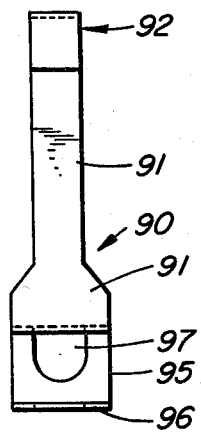
Figure 10:
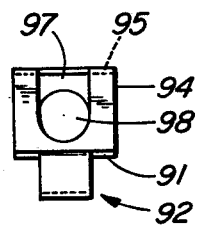
Figure 11:
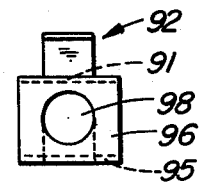

End portion 32 is formed by bending back the end of band 30 and attaching, as by welding, to the main portion of the band, to form a loop. The loop has a slot cut in it, defining two spaced legs, seen at 38 in FIG. 7. The tubular member 34 has a main tubular body portion 39 which passes through the slot, between legs 38, and has a Tee bar head portion 40 which extends laterally either side of the body portion 39, positioned in the loop of the end portion 32. The slot in the end portion 32 extends far enough that the rod 35 can pass between the legs and through the tubular member. The handle 36 has a transverse Tee bar 41.

The other end member 33 is formed from a separate piece of metal bent over to form a loop portion 45 and a tail portion 46, the loop portion extending back substantially to the tail portion. End member 33 is attached to the end of the band 30, as by welding at the tail portion 46 and at the inner end of the loop part 45. The end of the loop portion has a slot 47, defining two spaced legs 48. An aperture 49 is formed in the top of the loop portion 45, extending from one end of the slot 47. The rod 35 has a Tee shaped head which fits in the loop portion 45.

A channel shaped locking member 50 is positioned on the handle 36. To lock the handle 36 and Tee bar 41 from rotation, the member 50 is slid up, to embrace the Tee bar 41, and a padlock 51 inserted through holes 52 to retain the member in this position. This is seen in FIG. 2. It will be appreciated that the Tee bar 41 and handle 36 can only be rotated by less than a complete turn as the locking member engages with the band, and the housing.

The band clamp illustrated in FIGS. 1, 2 and 3 is extremely vulnerable to vandalism. Thus it is easy to insert the blade of a screwdriver, or similar object, down between one of the legs 38 and the member 34 and distort the leg sideways. This releases the head portion 40 and the band clamp can be released. It is also possible to distort the legs 48 and similarly release the head of the rod 35. This also releases the band clamp. By so releasing the band clamp, the housing is removable. If pressurized, the housing can be ejected upward, with possible injury and damage.

A band clamp which at least to a large extent overcomes the problems of the clamp at FIGS. 1, 2 and 3 is illustrated in FIGS. 4 to 11. The band clamp has a flat flexible band, 70, with Vee cross-section portions 71 attached thereto. End members 72 and 73 are attached to the ends of the band. Each end member includes a transverse web 74, 75 and a threaded bolt 76 extends through one web—web 74 in FIG. 4. The stem of the bolt passes through the other web, 75, and a tubular handle and member 78 fits over the bolt stem, the member 78 housing an internally threaded portion 79 at the inner end of the handle member which engages with the bolt thread. Rotation of the handle member opens or closes the clamp depending upon the direction of rotation. Rotation of the bolt 76 is prevented by a square portion adjacent to the head 77 fitting in a square hole in the web 74. A transverse rod 80 at the outer end of the handle 78 assists in rotating the handle.

The end members 72 and 73 are channel shaped members having a base web which is attached, as by welding, to the related end of the band. Two spaced parallel side members extend up from the base web. The overall width of one end member, member 73 in the example, is slightly less than the distance between the side members of the other end member, member 72. The side members have projections 81 at the front ends, and the projections on end member 73 can pass inside the projections on the other end member 72. The projections 81 are provided with holes 82, for a lock as described later. The end members are seen more clearly in FIGS. 6 and 7 where the bolt and handle member are omitted. In both FIGS. 5 and 7, the typical cross-section of the Vee shaped channel portions 71 are illustrated by dotted lines 83.

A locking member 90 is positioned on the handle 78 before the handle is assembled on to the bolt 76. The form of the handle is seen in FIGS. 8, 9, 10 and 11. The locking member is formed from a strip of metal with a central flat stem portion 91. At one end the strip is bent first up and then inward to form an open hook formation 92. At the other end the stem portions 91 is increased in width and is again bent to form at hook formation 93. In this instance the opening of the hook formation is generally in the plane of the stem portion 91.

Hook formation 93 has three web portions 94, 95 and 96. Web portion 94 extends out from and substantially normal to the stem and central web portion 95 extends from web portion 94, parallel to and away from the stem portion. Web portion 96 extends from the central web portion spaced from and parallel to the web portion 94, the other portions having a generally U shaped form. A slot 97 extends from the central portion into portion 94. A circular hole 98 is formed in the end web portion 96.

Figure 4:
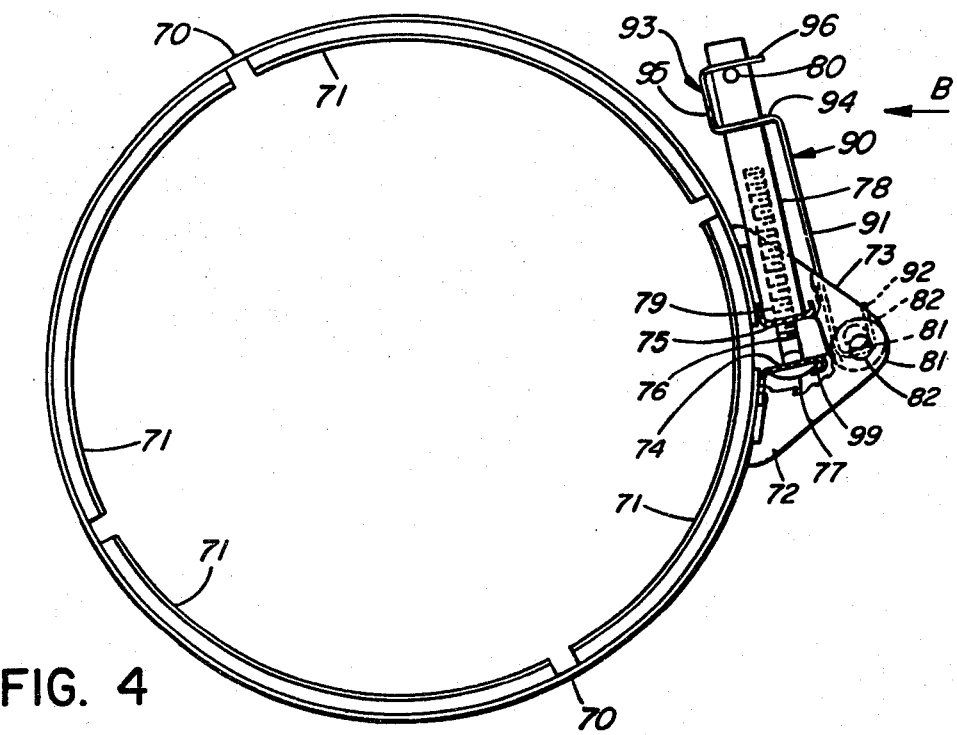
FIG. 4 is a plan view of a band clamp in accordance with the present invention.
Figure 5:
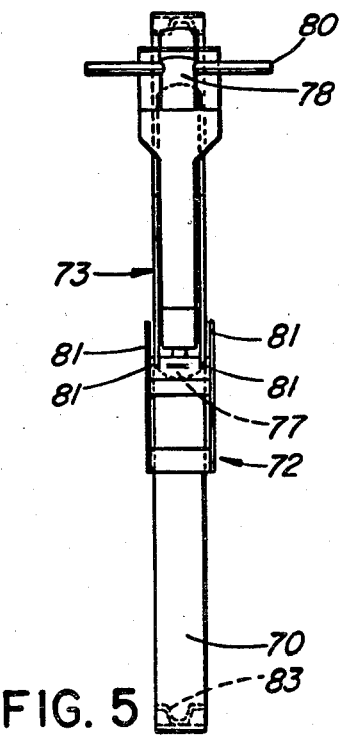
FIG. 5 is a side view of the band and clamp in the direction of arrow B in FIG. 4.

The locking member 90 is shown in a locking position in FIG. 4, a position in which rotation of the handle member 78 is prevented to any pertinent amount. The hook portion 93 embraces the handle member, on either side of the rod 80, with the outer end of the handle through circular hole 98 and web portion 96 against, or close to, the rod 80. The handle 78 also passes through slot 97, being in the portion of the slot formed in web portion 94 in this position. The hook portion 92 lies between the projections 81, aligned with the holes 82 in the projections 81 of the end members 72 and 73.

To rotate the handle 78, the locking member is slid along the handle until web portion 96 disengages from the handle. The locking member can then be swung, counter-clockwise in FIG. 4, to remove the hook portion 92 from between the extensions 81 of the end member. The handle then is in the slot 97, in that portion of the slot formed in web 93. Rotation of the handle in one direction causes the end members to move apart, loosening the clamp, while rotating the handle in the opposite direction moves the end member together, tightening the clamp. The projections 81 and holes 82 are formed and positioned such that the projections move into overlapping relationship as the clamp is tightened, the holes 82 in the extensions 81 moving into substantial alignment, when the clamp is tight. The locking member is then swung round, clockwise in FIG. 4 and slid along the handle 78 until web portion 96 is against or close to the rod 80. In this position a padlock can be attached, through holes 82 and engaging within the hook formation 92, to prevent release of the locking member. Rotation of the handle is thus prevented.

Various alterations and modifications can be made without changing the basic features of the invention. In the embodiment illustrated in FIGS. 4 to 11, the bolt 76 can pass through holes in the webs 74 and 75, or slots, extending from the edge of each web, can be provided, avoiding threading the bolt through two holes. The outer edge of the web 74 is bent over, as shown at 99 in FIG. 4, to hold the bolt in place. Further, instead of one end member 73, being slightly narrower than the other member, as described above and illustrated in the FIGS. 4 to 7, the end members can be the same width with one end member offset laterally a small distance so that the projections 81 can overlap.

While the invention has been described in relation to a housing for electrical equipment, it is equally applicable to any structure having two cooperating rims which are clamped together and then the locking member engaged to prevent loosening of the clamping.

What is claimed is:

1. A lockable band clamp for retaining two opposed rims in a clamped condition, comprising:
    a flexible band for positioning around said rims and including a plurality of portions having a Vee-shaped cross-section, the Vee opening inwards to embrace said rims;
    said flexible band having two cooperative ends, one end including a tubular member having an internally threaded portion at an inner end, said tubular member engaged with said one end of said band at said inner end, the other end of said flexible band including a rod having an externally threaded portion, the rod passing through said tubular member with said threaded portions interengaging;
    each end of the flexible band having an end member attached thereto and adapted to overlap each other on tightening the clamp;
    means for producing rotation of said tubular member to move said rod axially in the tubular member;
    said means for producing said rotation comprising an elongate locking member having a first end engaged over an outer end of said tubular member and rotatable about a longitudinal axis of the tubular member to an extent less than a single revolution;
    said elongate locking member pivotally mounted on said outer end to move about an axis transverse to said longitudinal axis to an initial position where said locking member extends laterally to rotate said tubular member, and also movable to a further position wherein a second end of said locking member is in overlapping relationship with said end members when the clamp is tightened;

said end members and said second end including means for locking said second end to said end members.

2. A band clamp as claimed in claim 1, said elongate locking member including a hook formation at said first end engaging with said outer end of said tubular member, and a further hook formation at said second end, said further hook formation overlapping said end members in a tightened condition, and said means for locking said second end and said end members comprising said further hook formation and holes through said end members.

3. A band clamp as claimed in claim 1, each said portion being of accurate form.

4. A band clamp as claimed in claim 1, each end member being of channel shape having a base web and two parallel spaced apart side members extending outward from said base web, the base webs attached to the flexible band.

5. A band clamp as claimed in claim 4, the side members of one end member capable of entering between the side members of the other end member.

6. A band clamp as claimed in claim 4, the side member of each end member having a projection at a front edge, the projection on one end member adopted to overlap the projections on the other end member on tightening the clamp.

7. A band clamp as claimed in claim 6, each projection including a hole therethrough, the holes positioned to be in substantial alignment when the clamp is in a tightened condition.

8. A band clamp as claimed in claim 4, each end member including a transverse web extending between said side members, a hole formed in each transverse web, said rod passing through said holes.

9. A band clamp as claimed in claim 8, said rod including a head abutting a first one of said transverse webs, the rod passing successively through the holes in the first transverse web and the other transverse web, the tubular member extending over said rod and abutting said other of said transverse webs on a side remote from said head on said rod, relative rotation between the tubular member and said rod varying the spacing between said transverse webs.

10. A band clamp as claimed in claim 9, said rod including a formation adjacent to said head, said hole in said first one of said transverse webs of a form to cooperate with said formation to prevent rotation of said rod; said means for producing relative rotation between said tubular member and said rod comprising means on said tubular member.

11. A band clamp as claimed in claim 10, said means on said tubular member comprising a transverse rod at an outer end of said tubular member, remote from the other transverse web.

12. A band clamp as claimed in claim 10, said internally threaded portion formed at an inner end of the tubular member.

13. A band clamp as claimed in claim 11, said locking member including a central stem portion, a first hook formation at one end of said stem portion, and a second hook formation at the other end of said stem portion; said second hook formation positioned on the outer end of the tubular member and engageable over said transverse rod in a locking position, said first hook formation positioned between said projections on said side members in said locking position, said first hook formation and said holes in same projections in substantial alignment in said locking position for positioning of a lock through said holes and said first hook formation.

14. A band clamp as claimed in claim 13, said first hook formation having three web portions, a first portion extending approximately normal to said stem portion, a third portion extending spaced from and parallel to said first portion, and a second, central, portion connecting said first and third portions, the three portions having a U-shaped form; an aperture in said third portion being sliding fit on the outer end of said tubular member; a slot extending from said first portion into said second portion, the width of the slot a sliding fit on the outer end of said tubular member; the tubular member extending through said slot, in the second portion and said stem portion extending outward from said tubular member away from said band in a first, unlocked position; the stem portion rotated to be approximately parallel to said tubular member to slide axially; the tubular member extending through said slot in the first portion, and also extending through said aperture, said transverse rod within said first hook formation in a second, locked, position.

* * * * *